(12) United States Patent
Qi et al.

(10) Patent No.: US 11,215,730 B2
(45) Date of Patent: Jan. 4, 2022

(54) CLOSE RANGE MICROWAVE IMAGING METHOD AND SYSTEM

(71) Applicants: CHINA COMMUNICATION TECHNOLOGY CO., LTD., Guangdong (CN); Shenzhen Institute of Terahertz Technology and Innovation, Guangdong (CN)

(72) Inventors: Chunchao Qi, Guangdong (CN); Aixian Wang, Guangdong (CN); Hanjiang Chen, Guangdong (CN); Lingxia Guo, Guangdong (CN); Chao Sun, Guangdong (CN); Xiaoxiang Hou, Guangdong (CN); Shukai Zhao, Guangdong (CN)

(73) Assignees: CHINA COMMUNICATION TECHNOLOGY CO., LTD., Shenzhen (CN); Shenzhen Institute of Terahertz Technology and Innovation, Shenzhen (CN)

( * ) Notice: Subject to any disclaimer, the term of this patent is extended or adjusted under 35 U.S.C. 154(b) by 360 days.

(21) Appl. No.: 16/345,971

(22) PCT Filed: Aug. 4, 2017

(86) PCT No.: PCT/CN2017/096099
§ 371 (c)(1),
(2) Date: Apr. 29, 2019

(87) PCT Pub. No.: WO2018/076884
PCT Pub. Date: May 3, 2018

(65) Prior Publication Data
US 2019/0243022 A1 Aug. 8, 2019

(30) Foreign Application Priority Data
Oct. 31, 2016 (CN) .......................... 201610931503.X

(51) Int. Cl.
*G01V 3/38* (2006.01)
*G01V 3/12* (2006.01)
(Continued)

(52) U.S. Cl.
CPC .............. *G01V 3/38* (2013.01); *G01S 7/2806* (2013.01); *G01S 13/887* (2013.01); *G01S 13/90* (2013.01);
(Continued)

(58) Field of Classification Search
CPC .......... G01V 3/38; G01V 3/12; G01S 7/2806; G01S 13/90; G01S 13/887
See application file for complete search history.

(56) References Cited

U.S. PATENT DOCUMENTS 3,713,156 A * 1/1973 Pothier ................. G01S 13/887
342/22
5,557,283 A 9/1996 Sheen et al.
(Continued)

FOREIGN PATENT DOCUMENTS

CN 102520408 A 6/2012
CN 102540183 A 7/2012
(Continued)

*Primary Examiner* — Peter M Bythrow
(74) *Attorney, Agent, or Firm* — Young Basile Hanlon & MacFarlane, P.C.

(57) ABSTRACT

A close range microwave imaging method and system is provided. The method comprises: controlling a linear antenna array consisting of a preset number of antennas to rotate along a preset arc trajectory so as to scan a target region; controlling the linear antenna array to acquire a preset number of echo data at azimuthal positions on the arc trajectory and to send an echo data set constituted by the preset number of echo data to a signal processing device until the linear antenna array completes the acquisition of echo data at preset azimuthal positions on the arc trajectory; and controlling, every time the signal processing device (Continued)

receives the echo data set, the signal processing device to perform imaging processing on the echo data set.

18 Claims, 3 Drawing Sheets

(51) Int. Cl.
| | |
|---|---|
| *G01S 13/88* | (2006.01) |
| *G01S 13/90* | (2006.01) |
| *G01S 7/28* | (2006.01) |
| *G01S 13/00* | (2006.01) |
| *G01S 7/00* | (2006.01) |

(52) U.S. Cl.
CPC ................. *G01V 3/12* (2013.01); *G01S 7/00* (2013.01); *G01S 13/00* (2013.01)

(56) References Cited

U.S. PATENT DOCUMENTS

| | | | | |
|---|---|---|---|---|
| 5,859,609 | A * | 1/1999 | Sheen | G01S 7/412 |
| | | | | 342/179 |
| 6,870,162 | B1 * | 3/2005 | Vaidya | H04N 5/217 |
| | | | | 250/330 |
| 6,965,340 | B1 * | 11/2005 | Baharav | G01S 13/89 |
| | | | | 342/22 |
| 7,212,153 | B2 * | 5/2007 | Rowe | G01S 13/887 |
| | | | | 342/179 |
| 7,253,766 | B2 * | 8/2007 | Foote | G06T 7/12 |
| | | | | 342/22 |
| 7,405,692 | B2 * | 7/2008 | McMakin | G01S 7/41 |
| | | | | 342/22 |
| 9,791,553 | B2 * | 10/2017 | Rose | G06T 15/04 |
| 2004/0140924 | A1 * | 7/2004 | Keller | G01S 13/887 |
| | | | | 342/22 |
| 2005/0093733 | A1 * | 5/2005 | Lovberg | G01V 8/005 |
| | | | | 342/22 |
| 2005/0232459 | A1 * | 10/2005 | Rowe | G01S 13/86 |
| | | | | 382/100 |
| 2006/0017605 | A1 * | 1/2006 | Lovberg | G01K 7/226 |
| | | | | 342/22 |
| 2007/0263907 | A1 * | 11/2007 | McMakin | G06K 9/00369 |
| | | | | 382/115 |
| 2009/0073023 | A1 * | 3/2009 | Ammar | G01S 17/89 |
| | | | | 342/22 |
| 2010/0013920 | A1 * | 1/2010 | Nikulin | G01S 13/89 |
| | | | | 348/143 |
| 2010/0265117 | A1 * | 10/2010 | Weiss | G01S 13/003 |
| | | | | 342/22 |
| 2011/0043403 | A1 * | 2/2011 | Loffler | G01S 13/887 |
| | | | | 342/25 A |
| 2011/0050480 | A1 * | 3/2011 | Kroning | G01S 13/89 |
| | | | | 342/27 |
| 2011/0102597 | A1 * | 5/2011 | Daly | G01S 13/887 |
| | | | | 348/162 |
| 2015/0048964 | A1 * | 2/2015 | Chen | G01S 13/887 |
| | | | | 342/22 |
| 2015/0253422 | A1 * | 9/2015 | Morton | G01V 8/005 |
| | | | | 324/642 |
| 2015/0323664 | A1 * | 11/2015 | Wu | G01V 8/005 |
| | | | | 342/22 |
| 2016/0216371 | A1 * | 7/2016 | Ahmed | G01V 8/005 |
| 2016/0259047 | A1 * | 9/2016 | Blech | G01S 7/02 |
| 2016/0291148 | A1 * | 10/2016 | Ellenbogen | G01S 7/04 |
| 2017/0038467 | A1 * | 2/2017 | Levita | G01S 13/003 |
| 2018/0321374 | A1 * | 11/2018 | Qi | G01V 8/005 |
| 2019/0004171 | A1 * | 1/2019 | Qi | G01S 13/89 |

FOREIGN PATENT DOCUMENTS

| | | |
|---|---|---|
| CN | 102565795 A | 7/2012 |
| CN | 103018738 A | 4/2013 |
| CN | 104133213 A | 11/2014 |
| CN | 106556874 A | 4/2017 |

* cited by examiner

CLOSE RANGE MICROWAVE IMAGING METHOD AND SYSTEM

CROSS-REFERENCE TO RELATED APPLICATION(S)

This application is a 371 application of International Application No. PCT/CN2017/096099, filed on Aug. 4, 2017, which claims priority to Chinese Patent Application No. 201610931503.X, filed on Oct. 31, 2016, the contents of all of which are herein incorporated by reference in their entireties.

TECHNICAL FIELD

The application belongs to the technical field of close range microwave imaging, and particularly to a close range microwave imaging method and system.

BACKGROUND

The close range microwave imaging technology scans and images an object by actively emitting electromagnetic waves in microwave bands. Due to the ability to penetrate through a surface of the object to detect metal or nonmetal prohibited goods hidden in the object and the characteristics of small radiation dose and non-ionizing radiation, the close range microwave imaging technology is widely used in security check systems for performing human body security check tasks.

However, the currently popular close range microwave imaging technology requires that an echo data set composed of echo data at all equivalent antenna acquisition positions should be obtained first, then the echo data set is transmitted to a signal processing device of a security check system for unified imaging processing, finally an image of a target point object can be obtained, imaging processing cannot be carried out during data acquisition, and data processing efficiency is low.

SUMMARY

The embodiment of the application provides a close range microwave imaging method and system, which can perform imaging processing during data acquisition, effectively improve the processing speed of close range microwave imaging, reduce the processing time, and realize real-time imaging.

One aspect of the embodiment of the application provides a close range microwave imaging method comprising:

dividing a target region to obtain a grid set having a preset resolution;

creating a storage region for storing imaging results of the target region; the imaging results being represented in the form of a matrix having a preset resolution, each grid in the grid set corresponding to an element in the matrix, and the value of each element being the imaging result of the grid corresponding to the element;

controlling a linear antenna array consisting of a preset number of antennas to rotate along a preset arc trajectory so as to scan the target region; controlling the linear antenna array to acquire a preset number of echo data at azimuthal positions on the arc trajectory and to send an echo data set constituted by the preset number of echo data to a signal processing device until the linear antenna array completes the acquisition of echo data at preset azimuthal positions on the arc trajectory; and controlling, every time the signal processing device receives the echo data set, the signal processing device to perform imaging processing on the echo data set, and to store the imaging results in the matrix.

Another aspect of the embodiment of the application provides a close range microwave imaging system comprising:

a gridding module, used for dividing a target region to obtain a grid set having a preset resolution;

a partitioned storage module, used for creating a storage region for storing imaging results of the target region, the imaging results being represented in the form of a matrix having a preset resolution, each grid in the grid set corresponding to an element in the matrix, and the value of each element being the imaging result of the grid corresponding to the element;

a data acquisition module, used for controlling a linear antenna array consisting of a preset number of antennas to rotate along a preset arc trajectory so as to scan the target region; controlling the linear antenna array to acquire a preset number of echo data at azimuthal positions on the arc trajectory and to send an echo data set constituted by the preset number of echo data to a signal processing device until the linear antenna array completes the acquisition of echo data at preset azimuthal positions on the arc trajectory; and a data processing module, used for controlling, every time the signal processing device receives the echo data set, the signal processing device to perform imaging processing on the echo data set, and to store the imaging results in the matrix.

According to the embodiment of the application, by controlling, every time the signal processing device receives the echo data set, the signal processing device to perform imaging processing on the echo data set, the processing speed of close range microwave imaging can be effectively improved, the processing time can be reduced, and real-time imaging can be realized.

BRIEF DESCRIPTION OF DRAWINGS

In order to explain the technical solutions in the embodiment of the present application more clearly, the drawings used in the embodiment are briefly introduced below. Obviously, the drawings as follows are some embodiments of the present application. For those skilled in the art, other drawings can be obtained according to these drawings without creative labor.

DETAILED DESCRIPTION

The technical solutions in the embodiments of the present application will be described detailly in the following with reference to the accompanying drawings to make those skilled in the art understand better. Obviously, the described embodiments are merely a part of the embodiments of the present application, and all other embodiments obtained by those skilled in the art based on the following embodiments without creative efforts shall be within the protection scope of the present application.

The term "comprise/comprising" and any variations thereof in the description and claims of the present application are intended to cover a non-exclusive inclusion. For example, a process, method or system, product or device including a series of steps or units is not limited to the listed steps or modules, but may optionally further include steps or modules not listed, or may optionally further include other steps or modules inherent to these processes, methods, products or devices.

All embodiments of the present application are implemented based on a close range microwave imaging system, which consists of a linear antenna array consisting of a preset number of antennas arranged linearly, a signal transceiving device, a mechanical rotating device and a signal processing device.

In specific applications, the signal processing device may be a Graphics Processing Unit (GPU).

The mechanical rotating device controls the rotation of the linear antenna array, the signal transceiving device transmits signals and receives echo data reflected by an object to be imaged through the linear antenna array in the rotation process, and the signal transceiving device transmits the echo data to the signal processing device to be processed into imaging results, so as to realize scan-imaging of each sampling point on the object to be imaged. According to a shape of a scanning surface formed by equivalent phase positions during the rotation of the linear antenna array, the close range microwave imaging systems can be divided into flat scanning systems or cylindrical scanning systems.

Figure 1:
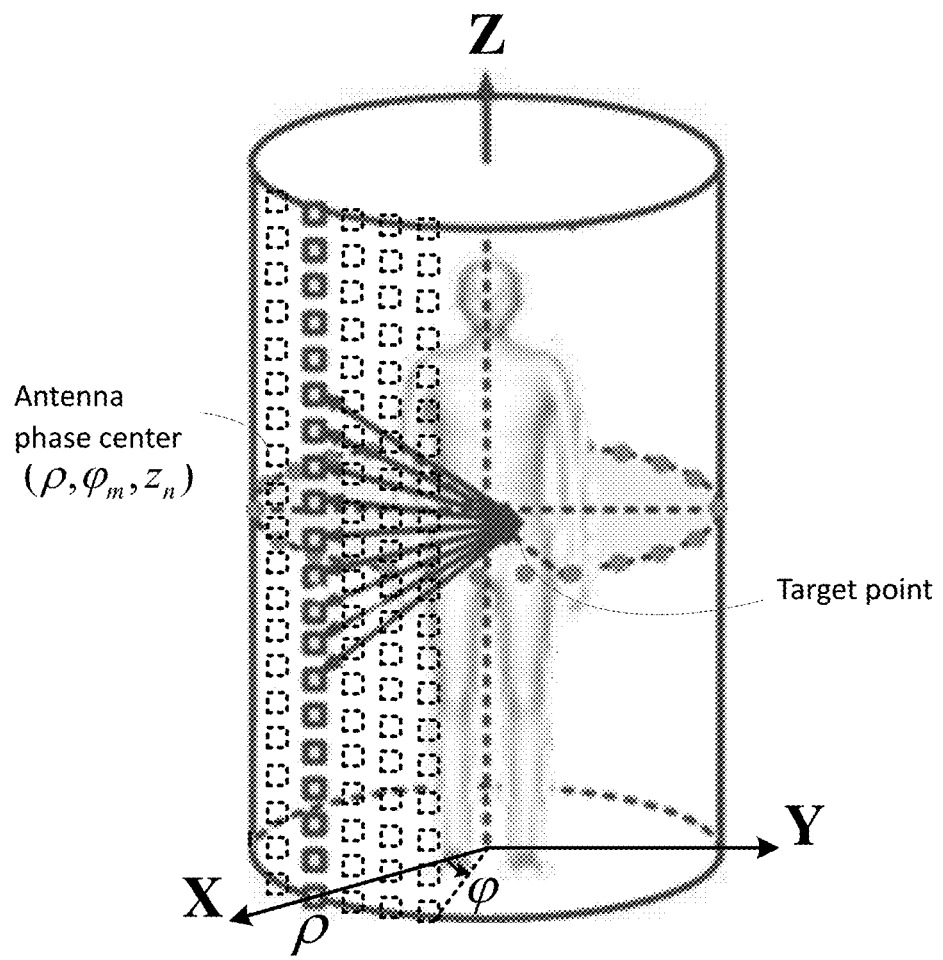
FIG. 1 is a schematic diagram of a cylindrical scanning system under the Cartesian coordinate system according to one embodiment of the present application.

The following focuses on the working principle of the cylindrical scanning system:

As shown in FIG. 1, the object to be imaged is set as a human body, a plane on which the human body stands naturally is set as a horizontal plane, an axis orthogonal to an X axis and in the same horizontal plane is set as a Y axis, a point 0 where the X axis, the Y axis and a Z axis intersect on a central axis of the set is set, and a Cartesian coordinate system X-Y-Z-0 including the X axis, the Y axis and the Z axis is established with 0 as an origin.

N antennas form a linear antenna array in the Z-axis direction perpendicular to the horizontal plane. A distance between the linear antenna array and a geometric central axis of the cylindrical scanning system is $\rho$. After rotating around the geometric central axis by a circle, the linear antenna array equivalently forms a plurality of equivalent antenna positions with equal azimuth intervals and equal height intervals distributed on a cylindrical surface, and the equivalent antenna positions are called equivalent phase centers of the antennas.

Cylindrical Coordinates $(\rho, \varphi_m, z_n)$ are used to represent a position of the equivalent phase center of a certain antenna, wherein $\varphi_m$ represents an azimuth coordinate value of a sampling point at an $m^{th}$ azimuth position under the condition of sampling at equal azimuth intervals, wherein $0 \leq m \leq M-1$, M represents a total number of sampling points of the same antenna rotating around the geometric central axis by a circle, and azimuth refers to a change angle of an X-axis coordinate of a certain antenna; and $Z_n$ represents a Z-axis coordinate value of an $n^{th}$ sampling point in the Z-axis direction under the condition of sampling at equal intervals in the Z-axis direction, wherein $0 \leq n \leq N-1$, and N represents a total number of sampling points of the linear antenna array in the Z-axis direction. At a certain azimuth coordinate value $\varphi_m$, the transmission and reception of microwave signals of the antennas are realized by controlling on and off of a microwave switch. When the equivalent phase center of the $0^{th}$ antenna included in the linear antenna array performs scanning towards the equivalent phase center of the $N-1^{th}$ antenna in sequence, a switching speed of the microwave switch is at a nanosecond level, and the transmission and reception time of the signals is at the level of dozens of nanoseconds. Therefore, the scanning time difference between different antennas in the scanning process of the linear antenna array can be ignored, and all the antennas in the linear antenna array can be considered to transmit and receive signals simultaneously.

In specific applications, the mechanical rotating device controls the linear antenna array to rotate along an arc trajectory orthogonal to the linear antenna array to scan the object to be checked, rotation of 0-2π (including endpoint value) is completed after scanning by a circle, and the required time is 5-6 seconds.

The microwave signal $s_t(t)$ emitted from the equivalent phase center of a certain antenna is set to be a chirp signal, and the expression is:

$$s_t(t) = A \times rect\left(\frac{t}{T_s}\right) \times \exp\left(j2\pi f_c t + j\pi \frac{B}{T_s} t^2\right);$$

wherein t represents time, A represents an amplitude of the transmitted signal, $T_s$ represents a width of the transmitted signal, $f_c$ represents a center frequency of the transmitted signal, and B represents a bandwidth of the transmitted signal.

Assuming that the coordinates of a target point P at a certain position in a target region on a human body in the Cartesian coordinate system are $(x_p, y_p, z_p)$, and a scattering coefficient thereof is represented by $\sigma(x_p, y_p, z_p)$, then for the equivalent phase center of the on at certain cylindrical coordinates $(\rho, \varphi_m, z_n)$, the microwave signal $s_t(t)$ is radiated on the target point P, and the signal scattered by the target point P and then received by the antenna at the coordinates $(\rho, \varphi_m, z_n)$ is expressed as:

$$s_r(\varphi_m, z_n, t) = A' \times \int\int\int_{P \in V} rect\left(\frac{t - 2R/C}{T_s}\right) \times$$
$$F \times \exp\left[j2\pi f_c\left(t - \frac{2R}{C}\right) + j\pi \frac{B}{T_s}\left(t - \frac{2R}{C}\right)^2\right] dV$$

wherein $0 \leq m \leq M-1$, $0 \leq n \leq N-1$, A' represents an amplitude of the received signal, C represents a propagation speed of electromagnetic waves in vacuum, F is a factor showing whether the target point P is within an irradiation range of the current antenna, when the target point P is within the irradiation range of the current antenna, F is 1, otherwise F is 0, V represents that the target point P belongs to the target region on the human body, R represents an instantaneous slant distance between the target point P and the equivalent phase center of the current antenna, and the expression of R is:

$$R = \sqrt{(\rho\cos\varphi_m - x_p)^2 + (\rho\sin\varphi_m - y_p)^2 + (z_n - z_p)^2};$$

After analogue de-chirp operation in the signal transceiving device, the received signal $s_r(t)$ is expressed as follows:

$$s_{r2}(\varphi_m, z_n, f) = A''' \times \int\int\int_{P\in V} F \times \exp\left(-j\frac{4\pi f}{C}R\right)dV;$$

wherein f represents a frequency of the signal and its range is $f\in[f_c-B/2, f_c+B/2]$.

After analog-to-digital sampling, the above signal is an echo data acquired by the equivalent phase center of the antenna at the current cylindrical coordinates $(\rho, \varphi_m, z_n)$. Assuming that L sampling points are collected on a signal frequency axis f after analog-to-digital sampling, the expression of the echo data acquired at the equivalent phase center of the antenna at the cylindrical coordinates $(\rho, \varphi_m, z_n)$ is:

$$s'_r(\varphi_m, z_n, f_l) = A''' \times \int\int\int_{P\in V} F \times \exp\left(-j\frac{4\pi f_l}{C}R\right)dV,$$
$$l = 0, 1, \ldots, L-1;$$

wherein $f_l$ represents a frequency of an $l^{th}$ frequency point. Generally, the purpose of three-dimensional imaging processing is to invert or reconstruct the spatial distribution $\sigma(x_p, y_p, z_p)$ of scattering coefficients of all target points on the target region on the human body V through a plurality of echo data, wherein $(x_p, y_p, z_p)\in V$.

At a fixed azimuth coordinate value $\varphi_m$, an echo data set $D_m = \{s'_r(\varphi_m, z_0, f_l), s'_r(\varphi_m, z_1, f_l), \ldots, s'_r(\varphi_m, z_{N-1}, f_l)\}$ composed of N echo data acquired at N equivalent phase center positions of N antennas on the linear antenna array can be obtained, wherein $l=0, 1, \ldots, L-1$.

In the prior art, a data set $\overline{D}=\{D_0, D_1, \ldots, D_m, \ldots, D_{M-1}\}$ consisting of echo data acquired at the equivalent phase center positions of all antennas is usually obtained first, and then time and frequency information of sampling points corresponding to all the echo data in the data set $\overline{D}=\{D_0, D_1, \ldots, D_m, \ldots, D_{M-1}\}$ is imaged to generate a three-dimensional image of a target region on a human body, which takes a long time for data processing.

The embodiment of the application is to provide a close range microwave imaging method and system, wherein the echo data set $D_m=\{s'_r(\varphi_m, z_0, f_l), s'_r(\varphi_m, z_1, f_l), \ldots, s'_r(\varphi_m, z_{N-1}, f_l)\}$ acquired by the linear antenna array at each azimuth $\varphi_m$ position is timely sent to the signal processing device for imaging processing, so that imaging processing does not need to be conducted until all the data is acquired, the real-time performance of data processing is increased, the working efficiency is improved, and the data processing time is reduced.

Figure 2:
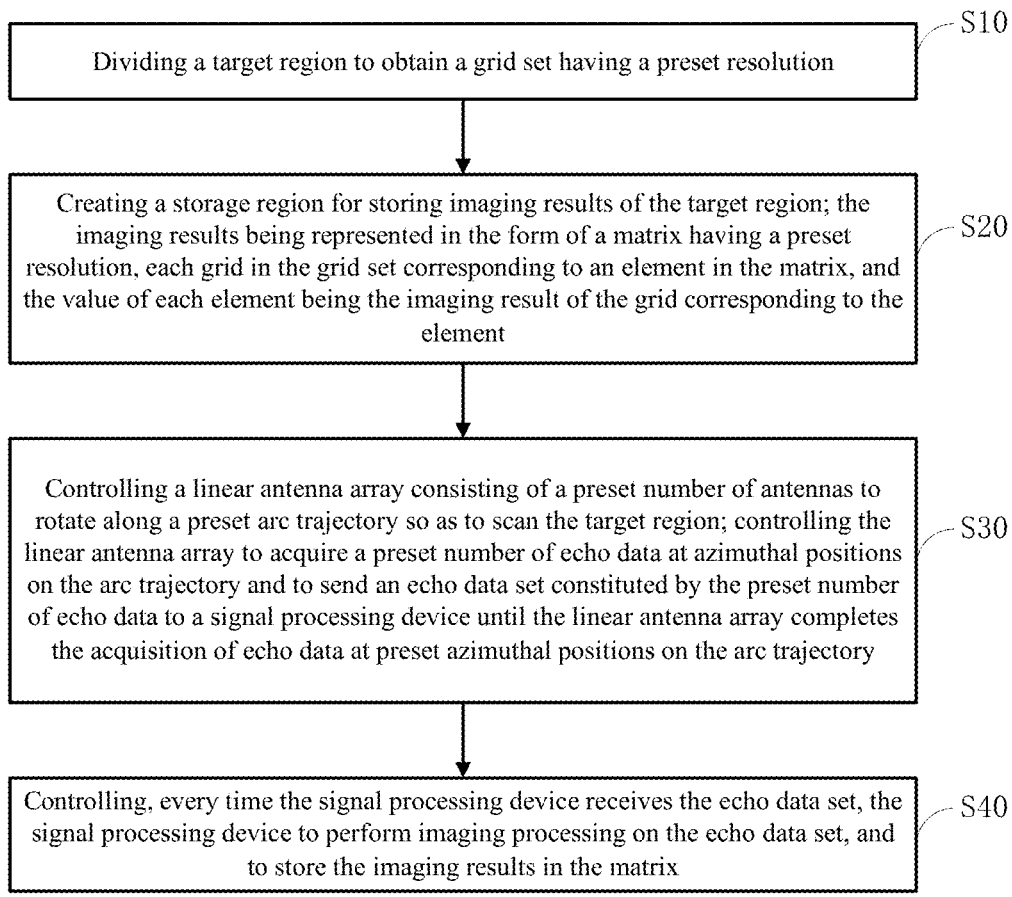
FIG. 2 is a flow block diagram of a close range microwave imaging method according to one embodiment of the present application.

As shown in FIG. 2, one embodiment of the present application provides a close range microwave imaging method comprising:

S10, dividing a target region to obtain a grid set having a preset resolution.

In this embodiment, the target region refers to a region where an object to be imaged is located. The size of the region is determined by the size of a scanning region which can be covered by the linear antenna array, rotating by a circle, of the close range microwave imaging system. Grids in the grid set are target points to be imaged.

In specific applications, the object to be imaged can be a human body, or other organisms or non-organisms, the object to be imaged can be a one-dimensional, two-dimensional or three-dimensional object, and the corresponding grid set can be one-dimensional, two-dimensional or three-dimensional.

S20, creating a storage region for storing imaging results of the target region; the imaging results being represented in the form of a matrix having a preset resolution, each grid in the grid set corresponding to an element in the matrix, and the value of each element being the imaging result of the grid corresponding to the element.

In specific applications, the preset resolution can be set according to actual imaging accuracy requirements.

In this embodiment, by pre-creating the storage regions, it is convenient to store the imaging results obtained by each processing of the signal processing device in the subsequent process.

In specific applications, an initial value of each element in the matrix is set to be 0.

S30, controlling a linear antenna array consisting of a preset number of antennas to rotate along a preset arc trajectory so as to scan the target region; controlling the linear antenna array to acquire a preset number of echo data at azimuthal positions on the arc trajectory and to send an echo data set constituted by the preset number of echo data to a signal processing device until the linear antenna array completes the acquisition of echo data at preset azimuthal positions on the arc trajectory.

In this embodiment, the arc trajectory is an arc trajectory orthogonal to the linear antenna array, and the preset number of echo data is data obtained by analog-to-digital conversion of echo signals reflected by a preset number of grids.

S40, controlling, every time the signal processing device receives the echo data set, the signal processing device to perform imaging processing on the echo data set, and to store the imaging results in the matrix.

In specific applications, the linear antenna array acquires the echo data of each grid, and the signal processing device calculates and processes the echo data of each grid to obtain the imaging results expressed in the form of values of matrix elements corresponding to each grid.

According to the embodiment of the application, by controlling, every time the signal processing device receives the echo data set, the signal processing device to perform imaging processing on the echo data set, the processing speed of close range microwave imaging can be effectively improved, the processing time can be reduced, and real-time imaging can be realized.

Figure 3:
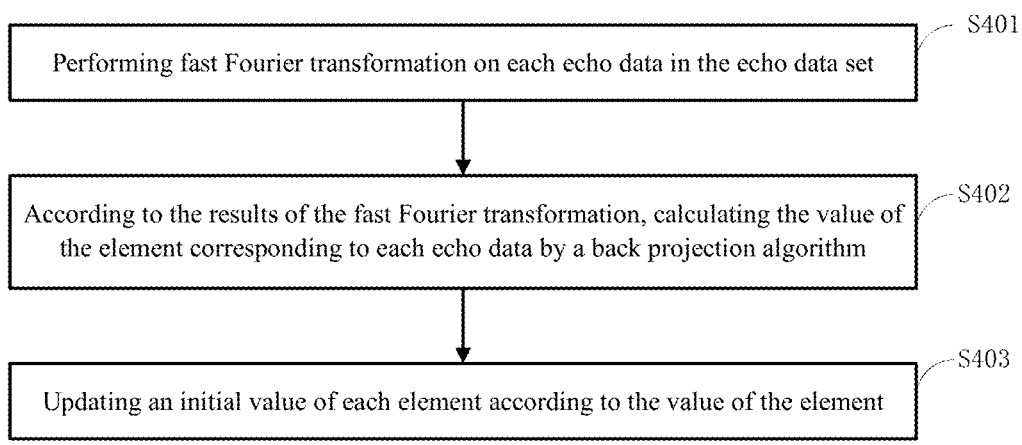
FIG. 3 is a flow block diagram of step S40 according to one embodiment of the present application.

As shown in FIG. 3, in one embodiment of the present application, S40 specifically comprises:

S401, performing fast Fourier transformation on each echo data in the echo data set.

In specific applications, the fast Fourier transformation may be parallel fast Fourier transformation, that is, each time the echo data set is acquired, and all the echo data in the echo data set are simultaneously subjected to fast Fourier transformation.

S402, according to the results of the fast Fourier transformation, calculating the value of the element corresponding to each echo data by a back projection algorithm.

In specific applications, the back projection algorithm may be a parallel back projection algorithm, that is, back projection algorithm calculation is performed on the fast Fourier transformation results of all the echo data included in the echo data set at the same time to obtain the value of the element corresponding to each echo data, which is the imaging result of the grid corresponding to the element.

In one embodiment, S402 specifically comprises:

performing fast Fourier transformation on each echo data in the echo data set along a frequency axis to obtain a data set corresponding to the echo data set, the data set comprising data corresponding to each echo data in the echo data set.

S403, updating the initial value of each element according to the value of the element.

In specific applications, before performing close range microwave imaging, the values of all the elements in the matrix representing the imaging results can be initialized to 0, and when the value of each element is obtained by subsequent calculation, the initial value of each element is updated to the calculated value.

In one embodiment, S403 specifically comprises:

according to the data set, calculating the value of the element corresponding to each echo data by a back projection algorithm based on interpolation.

The embodiment of the application can further improve the data processing efficiency and reduce the processing time by performing parallel processing on the echo data.

In one embodiment of the present application, when the close range microwave imaging method provided in the embodiment corresponding to FIG. 1 is used to obtain a three-dimensional imaging result of a human body, the method may specifically comprise:

S1, dividing a target region on the human body into three-dimensional grids with a resolution of $N_X \times N_Y \times N_Z$, wherein $N_X$, $N_Y$ and $N_Z$ respectively represent the number of grids in a horizontal axis (X axis in this embodiment) direction parallel to the horizontal plane under a Cartesian coordinate system, the number of grids in a longitudinal axis (Y axis in this embodiment) direction and the number of grids in a vertical axis (Z axis in this embodiment) direction perpendicular to the horizontal plane.

In specific applications, the horizontal plane refers to a plane perpendicular to a central axis in a height direction of the human body when the human body stands naturally.

In one embodiment, the method of three-dimensional grid division in S1 may comprise:

S11, determining the size of the target region on the human body under the Cartesian coordinate system through a division rule preset by a user or a division rule currently input by the user.

In this embodiment, the sizes to be imaged of the target region on the human body in the X axis, Y axis and Z axis directions are represented as $\Delta X$, $\Delta Y$ and $\Delta Z$ respectively. Generally, the naturally standing human body is located on the central axis where a circular center of the arc trajectory of the cylindrical scanning system is located, that is, the geometric central axis of the cylindrical scanning system.

In this embodiment, the X axis is defined as a direction from the back of the human body to the chest of the human body on the horizontal plane, and in specific applications, $\Delta X$ can be set to be a value greater than the thickness of the human body, for example, 0.5 m; the Y axis is defined to be a direction from one shoulder of the human body to the other shoulder on the horizontal plane, and in specific applications, $\Delta Y$ can be set to be a value larger than the width of the human body, for example, 1.0 m; and the Z axis is perpendicular to the horizontal plane and passes through the circular center of the arc trajectory, and in specific applications, $\Delta Y$ can be set to be a value greater than the height of the human body, for example, 2.2 m.

S12, setting the dimensions $\delta X$, $\delta Y$ and $\delta Z$ of the grids in the three-dimensional grid set in the X axis, Y axis, and Z axis directions.

In specific applications, $\delta X = \delta Y = \delta Z = 0.5$ cm.

S13, calculating the grid numbers $N_X$, $N_Y$ and $N_Z$ of the three-dimensional grid set in the X axis, Y axis and Z axis directions.

In specific applications, the grid numbers of the three-dimensional grid set in the X axis, Y axis and Z axis directions are $N_X = \lceil \Delta X / \delta X \rceil + 1$, $N_Y = \lceil \Delta Y / \delta Y \rceil + 1$ and $N_Z = \lceil \Delta Z / \delta Z \rceil + 1$ respectively, wherein the symbol $\lceil \ \rceil$ represents a ceiling operator.

S13, dividing the target region on the human body to obtain a three-dimensional grid set with a resolution of $N_X \times N_Y \times N_Z$ according to $N_X$, $N_Y$ and $N_Z$, and the coordinates of the grid with an index (i,j,k) in the three-dimensional grid set under the Cartesian coordinate system X-Y-Z-0 are:

$$(x'_i, y'_j, z'_k) = \left(\left(i - \frac{N_X - 1}{2}\right) \times \delta X, \left(j - \frac{N_Y - 1}{2}\right) \times \delta Y, \left(k - \frac{N_Z - 1}{2}\right) \times \delta Z\right)$$

S2, according to a three-dimensional grid division result in S1, controlling a signal processing device to create a storage region for storing the three-dimensional imaging results of the target region on the human body, the three-dimensional imaging results being expressed as a three-dimensional matrix I with a resolution of $N_X \times N_Y \times N_Z$, $N_X$, $N_Y$ and $N_Z$ respectively representing the number of elements in the three-dimensional matrix I in the horizontal direction, the longitudinal direction and the vertical direction, and the values of all elements of the three-dimensional matrix I being initialized to 0, that is I(i,j,k)=0, wherein $1 \leq i \leq N_X$, $1 \leq j \leq N_Y$, $1 \leq k \leq N_Z$.

In specific applications, the three-dimensional grid set has a one-to-one corresponding relationship with the grids and elements with the same footers in the three-dimensional matrix I.

S3, controlling, by a mechanical rotating device, the linear antenna array to rotate along an arc trajectory orthogonal to the linear antenna array, controlling the linear antenna array to acquire an echo data set $D_m = \{s'_r(\varphi_m, z_0, f_l), s'_r(\varphi_m, z_1, f_l), \ldots, s'_r(\varphi_m, z_n, f_l), \ldots, s'_r(\varphi_m, z_{N-1}, f_l)\}$ consisting of N echo data at N equivalent phase center positions $\{(\rho, \varphi_m, z_0), (\rho, \varphi_m, z_1), \ldots, (\rho, \varphi_m, z_n), \ldots, (\rho, \varphi_m, z_{N-1})\}$ of N antennas contained in the linear antenna array at an azimuth position $\varphi_m$, and send the echo data set $D_m$ to the signal processing device, controlling the linear antenna array to continue the mechanical rotating motion along the arc trajectory to the next azimuth position $\varphi_{m+1}$ for echo data acquisition until the echo data at a preset $M-1^{th}$ azimuth position on the arc trajectory are acquired, and after transmission and processing, storing a final imaging result of a human body target point in the three-dimensional imaging result matrix I.

S4, controlling the signal processing equipment to receive the echo data set $D_m = \{s'_r(\varphi_m, z_0, f_l), s'_r(\varphi_m, z_1, f_l), \ldots, s'_r(\varphi_m, z_n, f_l), \ldots, s'_r(\varphi_m, z_{N-1}, f_l)\}$, performing inverse fast Fourier transformation (IFFT) on each echo data in the echo data set $D_m = \{s'_r(\varphi_m, z_0, f_l), s'_r(\varphi_m, z_1, f_l), \ldots, s'_r(\varphi_m, z_n, f_l), \ldots, s'_r(\varphi_m, z_{N-1}, f_l)\}$, and calculating the value I(i,j,k) of each element in the three-dimensional matrix I through back projection, wherein $1 \leq i \leq N_X$, $1 \leq j \leq N_Y$, $1 \leq k \leq N_Z$, i, j and k are all integers, and updating the initial value of each element according to the calculated value I(i, j, k) of the element.

In one embodiment, S4 specifically comprises:

S41, controlling the signal processing device to receive the echo data set $D_m = \{s'_r(\varphi_m, z_0, f_l), s'_r(\varphi_m, z_1, f_l), \ldots, s'_r(\varphi_m, z_n, f_l), \ldots, s'_r(\varphi_m, z_{N-1}, f_l)\}$, and performing inverse fast Fourier transformation (IFFT) on each echo data in the echo data set $D_m=\{s'_r(\varphi_m,z_0,f_l), s'_r(\varphi_m,z_1,f_l), \ldots, s'_r(\varphi_m,z_n,f_l), \ldots, s'_r(\varphi_m,z_{N-1},f_l)\}$ along its signal frequency axis, for example, performing IFFT on an $n^{th}$ echo data to obtain a new data $s_{rc}(\varphi_m,z_n,t_l)$, $s_{rc}(\varphi_m,z_n,t_l)=\text{IFFT}_{f_l}\{s'_r(\varphi_m,z_n,f_l)\}$, wherein n=0, 1, ..., N. $\text{IFFT}_{f_l}\{\}$ represents an inverse fast Fourier transformation operator of the echo data in its signal frequency axis direction, $t_l$ represents a sampling axis of the echo data in a time domain, l=0, 1, ... L, wherein L represents the total number of sampling points of each echo data in its signal frequency axis direction before fast Fourier transformation.

S42, after N echo data in the echo data set $D_m$ are subjected to fast Fourier transformation, expressing all the obtained new data as a data set $D'_m$ in a set form, $D'_m=\{s_{rc}(\varphi_m,z_0,t_l), s_{rc}(\varphi_m,z_1,t_l), \ldots, s_{rc}(\varphi_m,z_n,t_l), \ldots, s_{rc}(\varphi_m,z_{N-1},t_l)\}$.

S43, calculating and updating the value I(i,j,k) of each element in the three-dimensional matrix I through a back projection formula $$I(i,j,k) += \sum_{n=0}^{N-1} s_{rc}\left(\varphi_m, z_n, t_l - \frac{2R'}{C}\right)\exp\left(j\frac{4\pi f_c}{C}R'\right)$$

according to the data in the new data set $D'_m$.

wherein the symbol "+=" indicates that a value at the right end of the symbol and a value of a variable at the left end of the symbol are added to serve as an updated value of the variable at the left end of the symbol, R' represents a length of a line connecting an equivalent phase bus with the cylindrical coordinates $(\rho,\varphi_m,z_n)$ with a geometric center of the grid with an index (i, j, k), C represents a propagation speed of electromagnetic waves in vacuum, and $f_c$ represents a center frequency of the signal emitted by the antenna.

In one embodiment, a value of $$s_{rc}\left(\varphi_m, z_n, t_l - \frac{2R'}{C}\right)$$

in the back projection formula in S43 is obtained by interpolating the $n^{th}$ data $s_{rc}(\varphi_m,z_n,t_l)$ in the new data set $D'_m$ obtained after fast Fourier transformation. Preferably, it can be realized by 3 cubic spline interpolations.

Figure 4:
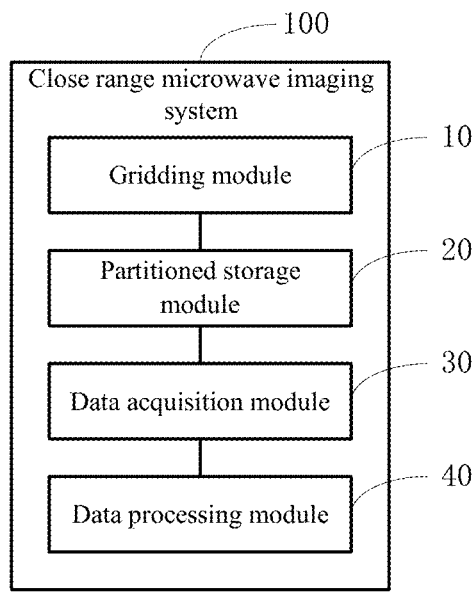
FIG. 4 is a structural block diagram of a close range microwave imaging system according to one embodiment of the present application.

As shown in FIG. 4, one embodiment of the present application provides a close range microwave imaging system 100, the system is used for executing the method steps in the embodiment corresponding to FIG. 2, and the system comprises:

a gridding module 10, used for dividing a target region to obtain a grid set having a preset resolution;

a partitioned storage module 20, used for creating a storage region for storing imaging results of the target region, the imaging results being represented in the form of a matrix having a preset resolution, each grid in the grid set corresponding to an element in the matrix, the value of each element being the imaging result of the grid corresponding to the element;

a data acquisition module 30, used for controlling a linear antenna array consisting of a preset number of antennas to rotate along a preset arc trajectory so as to scan the target region; controlling the linear antenna array to acquire a preset number of echo data at azimuthal positions on the arc trajectory and to send an echo data set constituted by the preset number of echo data to a signal processing device until the linear antenna array completes the acquisition of echo data at preset azimuthal positions on the arc trajectory; and a data processing module 40, used for controlling, every time the signal processing device receives the echo data set, the signal processing device to perform imaging processing on the echo data set, and to store the imaging results in the matrix.

According to the embodiment of the application, by controlling, every time the signal processing device receives the echo data set, the signal processing device to perform imaging processing on the echo data set, the processing speed of close range microwave imaging can be effectively improved, the processing time can be reduced, and real-time imaging can be realized.

Figure 5:
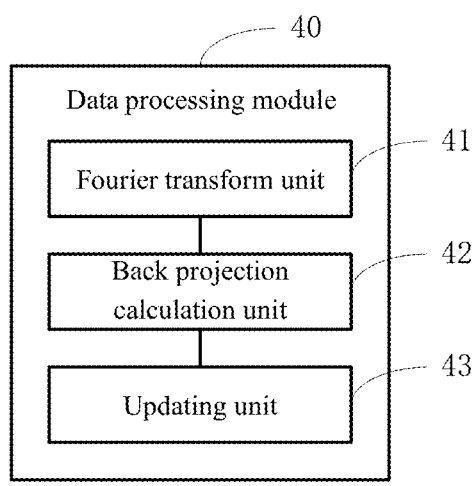
FIG. 5 is a structural block diagram of a data processing module according to one embodiment of the present application.

As shown in FIG. 5, in one embodiment of the present application, the data processing module 40 is used for executing the method steps in the embodiment corresponding to FIG. 3, and the data processing module 40 comprises:

a Fourier transform unit 41, used for performing fast Fourier transformation on each echo data in the echo data set;

a back projection calculation unit 42, used for calculating the value of the element corresponding to each echo data by a back projection algorithm according to the results of the fast Fourier transformation; and an updating unit 43, used for updating the initial value of each element according to the value of the element.

In one embodiment, the Fourier transform unit 41 is specifically used for:

performing fast Fourier transformation on each echo data in the echo data set along a frequency axis to obtain a data set corresponding to the echo data set, the data set comprising data corresponding to each echo data in the echo data set;

the back projection calculation unit 42 is specifically used for:

according to the data set, calculating the value of the element corresponding to each echo data by a back projection algorithm based on interpolation.

In specific applications, the interpolation method may be a spline interpolation method, the fast Fourier transformation may be parallel fast Fourier transformation, and the back projection algorithm may be a parallel back projection algorithm.

Modules or units in all embodiments of the present application may be implemented by a general-purpose integrated circuit, such as a Central Processing Unit (CPU), or by an Application Specific Integrated Circuit (ASIC).

The steps in the method embodiment of the application can be adjusted in terms of sequence, merged and deleted according to actual needs.

The modules or units in the device embodiment of the application can be merged, divided and deleted according to actual needs.

Those skilled in the art can understand that all or part of the flow in the method for implementing the above embodiments can be completed by instructing relevant hardware through a computer program, the program can be stored in a computer readable storage medium, and when executed, the program can include the flow of the above method embodiments. The storage medium may be a magnetic disk, an optical disk, a Read-Only Memory (ROM) or a Random Access Memory (RAM), etc.

The above is merely the preferred embodiment of the application and is not intended to limit the application. Any modifications, equivalent substitutions, improvements, etc., made within the spirit and principles of the application should be included within the scope of protection of the application.

What is claimed is:

1. A method for close range microwave imaging, comprising:
dividing a target region into grids, wherein the target region refers to a size of a target to be imaged under a coordinate system, and the grids form a grid set having a preset resolution;
creating a computer readable storage medium for storing imaging results of the target region, the imaging results being represented in a form of a matrix having a preset resolution, each grid in the grid set corresponding to an element in the matrix, and a value of the element being the imaging result of the grid corresponding to the element;
controlling a linear antenna array comprising a preset number of antennas to rotate along a preset arc trajectory so as to scan the target region, and controlling the linear antenna array to acquire a preset number of echo data at each azimuthal position on the arc trajectory and to send an echo data set comprising the preset number of echo data to a signal processing device until the linear antenna array completes acquiring echo data at preset azimuthal positions on the arc trajectory; and
controlling, every time the signal processing device receives an echo data set, the signal processing device to perform imaging processing on the echo data set to generate the imaging results, and to store the imaging results in the computer readable storage medium in a form of the matrix.

2. The method of claim 1, wherein performing imaging processing on the echo data set comprises:
performing fast Fourier transformation on each echo data in the echo data set to generate the imaging results;
calculating a value of an element corresponding to the each echo data with a back projection algorithm according to results of the fast Fourier transformation; and
updating an initial value of each element according to the calculated value of the element.

3. The method of claim 2, wherein performing fast Fourier transformation on each echo data in the echo data set comprises:
performing fast Fourier transformation on each echo data in the echo data set along a frequency axis to obtain a data set corresponding to the echo data set, the data set comprising data corresponding to each echo data in the echo data set; and
calculating a value of an element corresponding to the each echo data with a back projection algorithm according to results of the fast Fourier transformation comprises:
calculating the value of the element corresponding to the each echo data with a back projection algorithm based on interpolation approach, according to the data set.

4. The method of claim 3, wherein the interpolation approach is a spline interpolation approach.

5. The method of claim 2, wherein the fast Fourier transformation is parallel fast Fourier transformation, and the back projection algorithm is a parallel back projection algorithm.

6. A system for close range microwave imaging, comprising:
at least one processor; and
a memory storing instructions, which when executed by the at least one processor, cause the at least one processor to:
divide a target region into grids, wherein the target region refers to a size of a target to be imaged under a coordinate system and the grids form a grid set having a preset resolution;
create a computer readable storage medium for storing imaging results of the target region, the imaging results being represented in a form of a matrix having a preset resolution, each grid in the grid set corresponding to an element in the matrix, and a value of the element being the imaging result of the grid corresponding to the element;
control a linear antenna array comprising a preset number of antennas to rotate along a preset arc trajectory so as to scan the target region, and controlling the linear antenna array to acquire a preset number of echo data at each azimuthal position on the arc trajectory and to send an echo data set comprising the preset number of echo data to a signal processing device until the linear antenna array completes acquiring echo data at preset azimuthal positions on the arc trajectory; and
control, every time the signal processing device receives an echo data set, the signal processing device to perform imaging processing on the echo data set to generate the imaging results, and to store the imaging results in the computer readable storage medium in the form of the matrix.

7. The system of claim 6, wherein performing the imaging processing on the echo data set to generate the imaging results comprises:
performing fast Fourier transformation on each echo data in the echo data set;
calculating a value of an element corresponding to the each echo data with a back projection algorithm according to results of the fast Fourier transformation; and
updating an initial value of each element according to the calculated value of the element.

8. The system of claim 7, wherein performing fast Fourier transformation on each echo data in the echo data set comprises:
performing fast Fourier transformation on each echo data in the echo data set along a frequency axis to obtain a data set corresponding to the echo data set, the data set comprising data corresponding to each echo data in the echo data set; and
calculating the value of the element corresponding to the each echo data with the back projection algorithm according to results of the fast Fourier transformation comprises:
calculating the value of the element corresponding to the each echo data with a back projection algorithm based on interpolation approach, according to the data set.

9. The system of claim 8, wherein the interpolation approach is a spline interpolation approach.

10. The system of claim 7, wherein the fast Fourier transformation is parallel fast Fourier transformation, and the back projection algorithm is a parallel back projection algorithm.

11. The method of claim 3, wherein the fast Fourier transformation is parallel fast Fourier transformation, and the back projection algorithm is a parallel back projection algorithm.

12. The system of claim 8, wherein the fast Fourier transformation is parallel fast Fourier transformation, and the back projection algorithm is a parallel back projection algorithm.

13. A non-transitory computer storage medium storing a computer program, which when executed by one or more processors, cause the one or more processors to perform operations, the operations comprising:
dividing a target region into grids, wherein a target region refers to one of size of a target to be imaged under a coordinate system, and the grids form a grid set having a preset resolution;
creating a computer readable storage mediums for storing imaging results of the target region, the imaging results being represented in a form of a matrix having a preset resolution, each grid in the grid set corresponding to an element in the matrix, and a value of the element being the imaging result of the grid corresponding to the element;
controlling a linear antenna array comprising a preset number of antennas to rotate along a preset arc trajectory so as to scan the target region, and controlling the linear antenna array to acquire a preset number of echo data at each azimuthal position on the arc trajectory and to send an echo data set comprising the preset number of echo data to a signal processing device until the linear antenna array completes acquiring echo data at preset azimuthal positions on the arc trajectory; and
controlling, every time the signal processing device receives an echo data set, the signal processing device to perform imaging processing on the echo data set to generate the imaging results, and to store the imaging results in the compute readable storage medium in a form of the matrix.

14. The non-transitory computer storage medium of claim 13, wherein performing imaging processing on the echo data set to generate the imaging results comprises:
performing fast Fourier transformation on each echo data in the echo data set;
calculating a value of an element corresponding to the each echo data with a back projection algorithm according to results of the fast Fourier transformation; and
updating an initial value of each element according to the calculated value of the element.

15. The non-transitory computer storage medium of claim 14, wherein performing fast Fourier transformation on each echo data in the echo data set comprises:
performing fast Fourier transformation on each echo data in the echo data set along a frequency axis to obtain a data set corresponding to the echo data set, the data set comprising data corresponding to each echo data in the echo data set; and
calculating a value of an element corresponding to the each echo data with a back projection algorithm according to results of the fast Fourier transformation comprises:
calculating the value of the element corresponding to the each echo data with a back projection algorithm based on interpolation approach, according to the data set.

16. The non-transitory computer storage medium of claim 15, wherein the interpolation approach is a spline interpolation approach.

17. The non-transitory computer storage medium of claim 14, wherein the fast Fourier transformation is parallel fast Fourier transformation, and the back projection algorithm is a parallel back projection algorithm.

18. The non-transitory computer storage medium of claim 15, wherein the fast Fourier transformation is parallel fast Fourier transformation, and the back projection algorithm is a parallel back projection algorithm.

* * * * *